Jan. 8, 1935.  M. P. BROWNE  1,987,431

ADJUSTABLE SEAT FOR VEHICLES

Original Filed July 10, 1929   5 Sheets-Sheet 1

Inventor,
Montague P. Browne,
by Walter P. Geyer
Attorney.

Jan. 8, 1935.  M. P. BROWNE  1,987,431
ADJUSTABLE SEAT FOR VEHICLES
Original Filed July 10, 1929  5 Sheets-Sheet 2
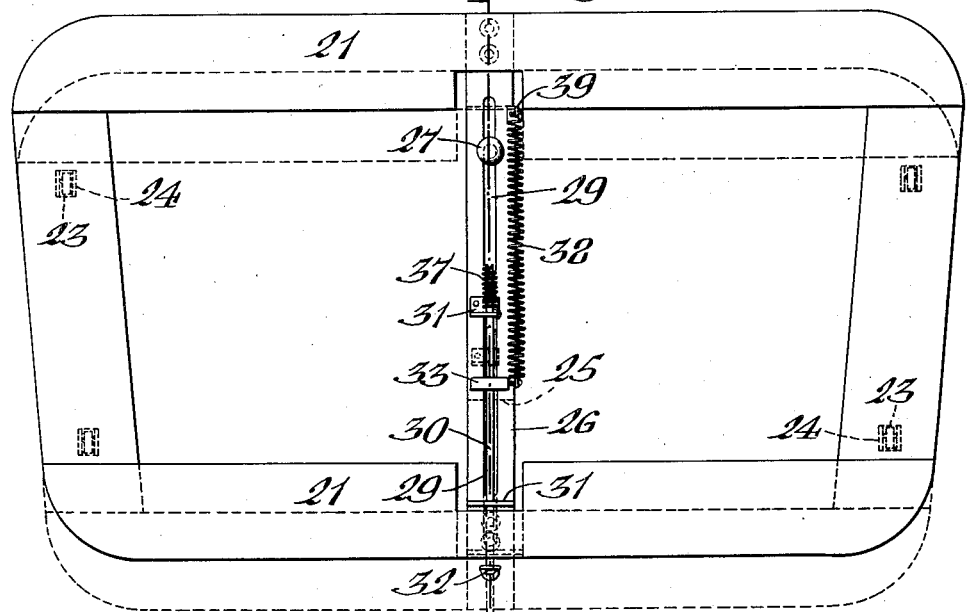
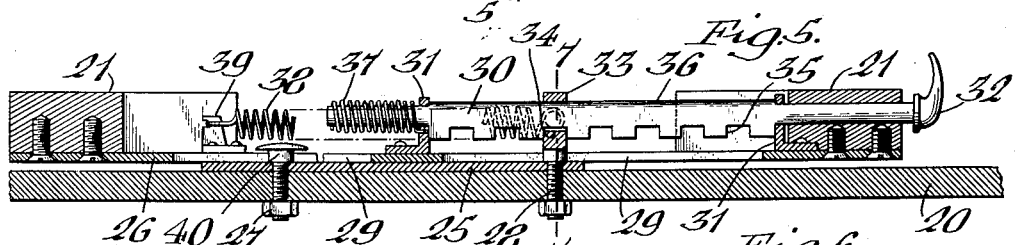
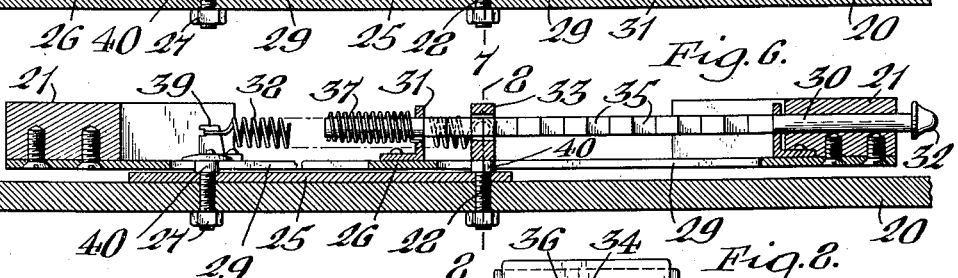
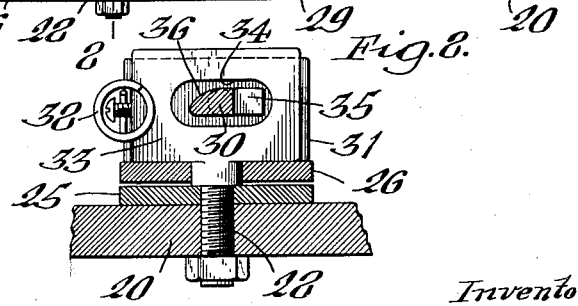
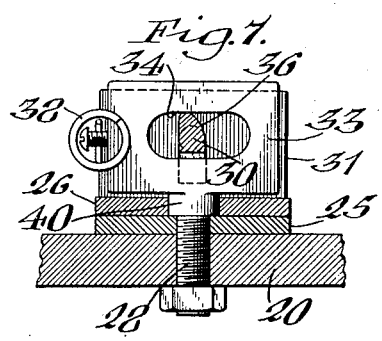
Inventor,
Montague P. Browne,
by Walter P. Geyer
Attorney.

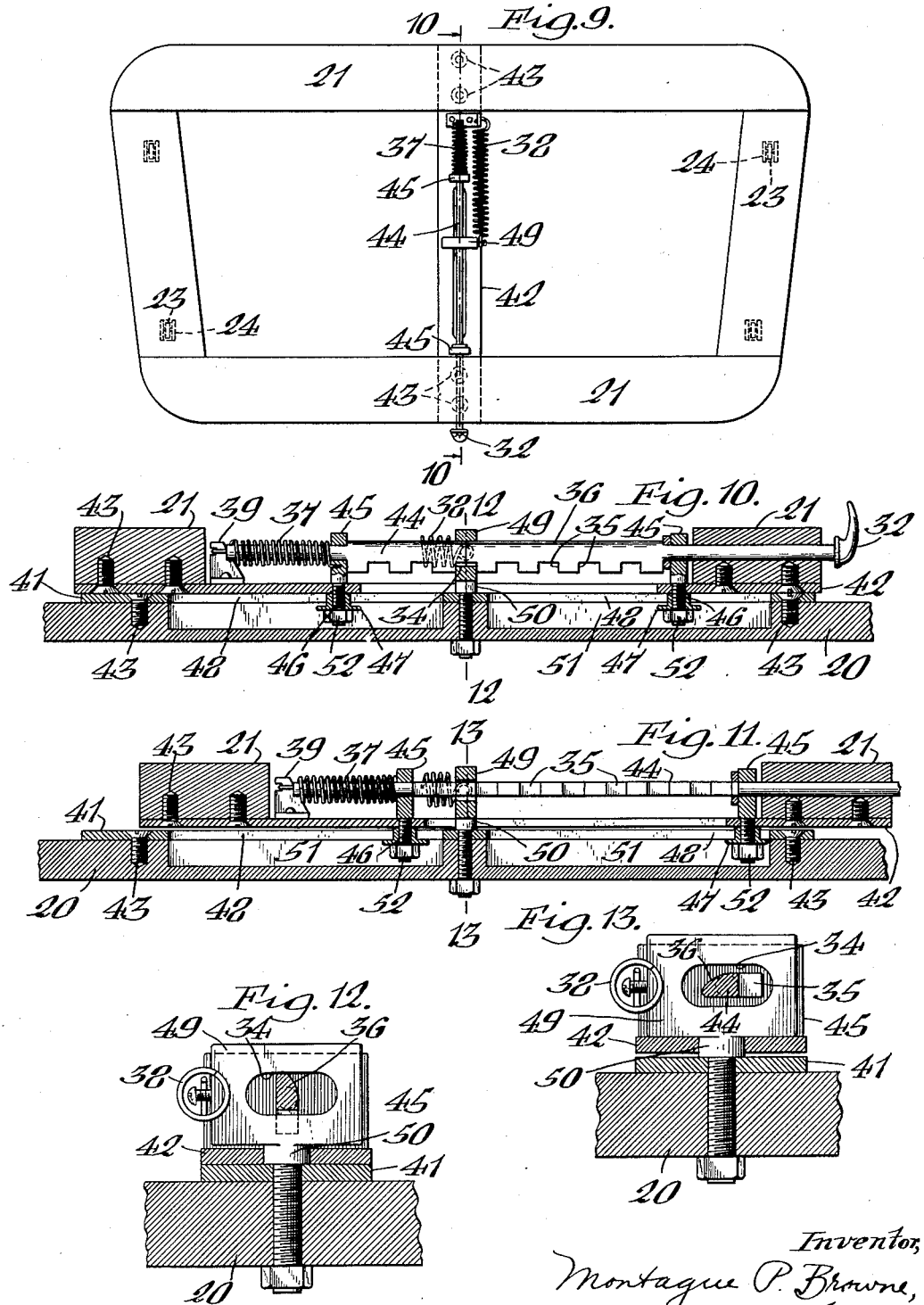

Jan. 8, 1935.　　　　　M. P. BROWNE　　　　　1,987,431
ADJUSTABLE SEAT FOR VEHICLES
Original Filed July 10, 1929　　5 Sheets-Sheet 4
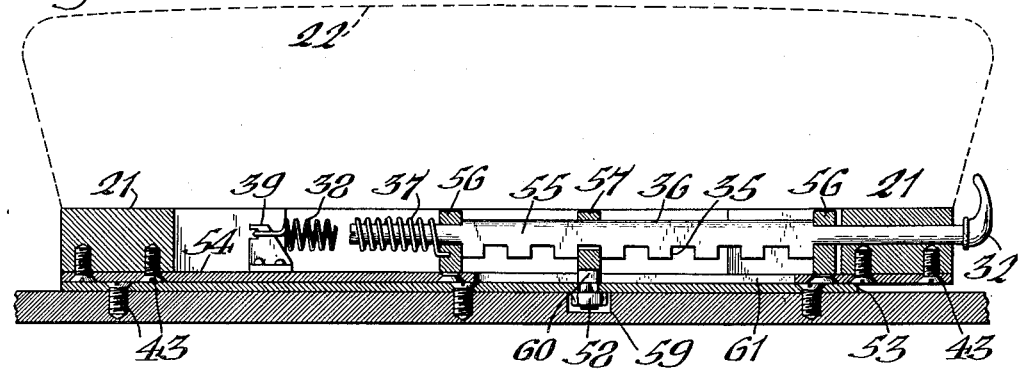
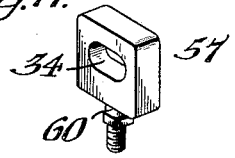
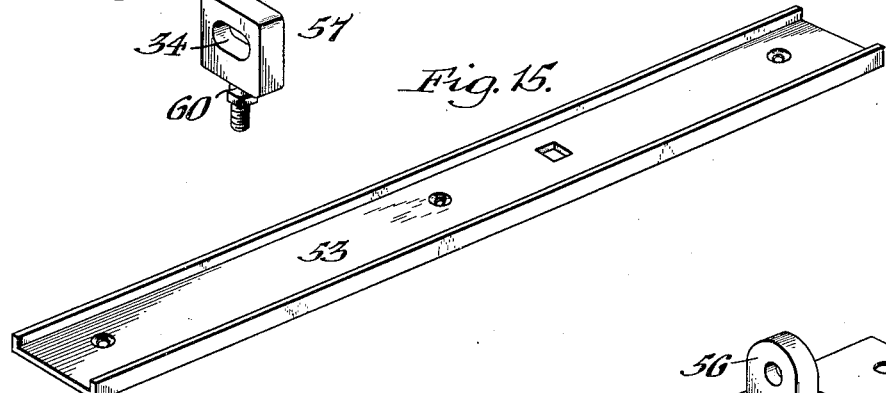
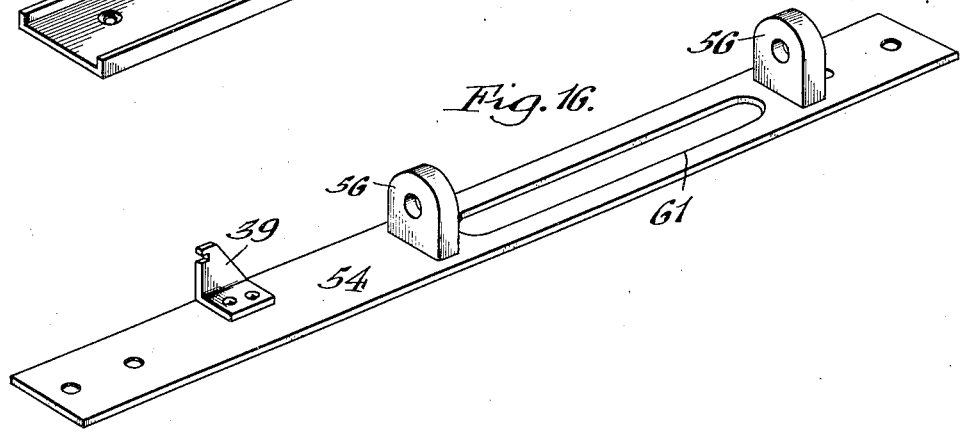
Inventor,
Montague P. Browne,
by Walter P. Geyer
Attorney.

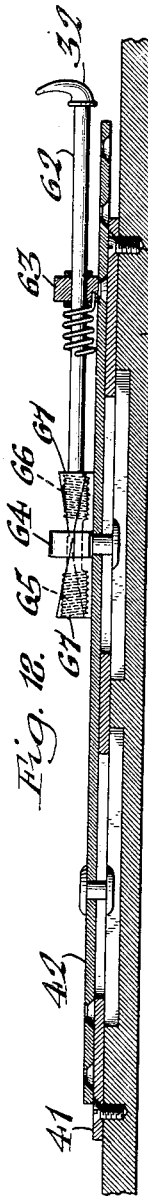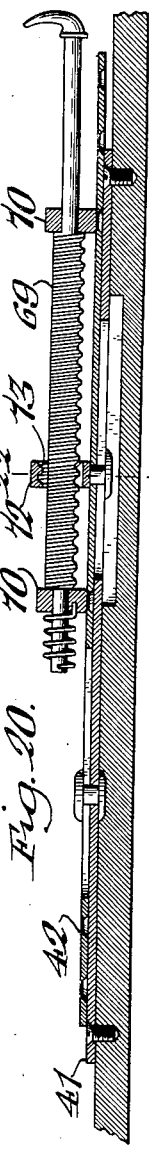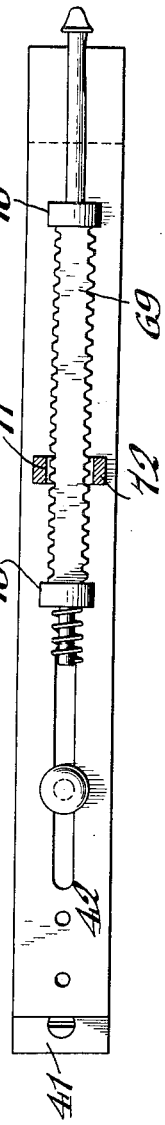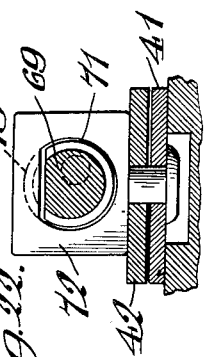

Patented Jan. 8, 1935

1,987,431

UNITED STATES PATENT OFFICE 1,987,431

ADJUSTABLE SEAT FOR VEHICLES

Montague P. Browne, Buffalo, N. Y., assignor to Mechanical Devices Corporation of America, Buffalo, N. Y., a corporation of New York Application July 10, 1929, Serial No. 377,181
Renewed November 27, 1934

15 Claims. (Cl. 155—14)

This invention relates generally to automobile seats but more particularly to a slidable mounting therefor to adapt the seat to suit the convenience of the driver in operating the car, and to facilitate the ingress and egress of passengers to and from the rear seat of the automobile.

One of its objects is the provision of a sliding seat of this character having simple, reliable and efficient means for effecting its control, the parts being so organized and arranged as to permit the gliding movement of the seat without its occupant leaving the same.

Another object of the invention is to provide novel and inexpensive means for guiding the seat during its movement and for effectively and rigidly clamping its parts to eliminate rattling.

A further object of the invention is the provision of a gliding seat control having positive means for selectively latching the seat in any one of a plurality of positions, the mechanism being so organized as to require but a minimum of effort on the part of the occupant to control it.

A still further object is the provision of a sliding seat control mechanism which is neat in appearance, which is composed of few parts, and which can be readily installed without obstructing the floor space of the vehicle.

Other features of the invention reside in the construction, combination and arrangement of parts hereinafter more fully described and particularly pointed out in the appended claims.

In the accompanying drawings:—

Figure 1:
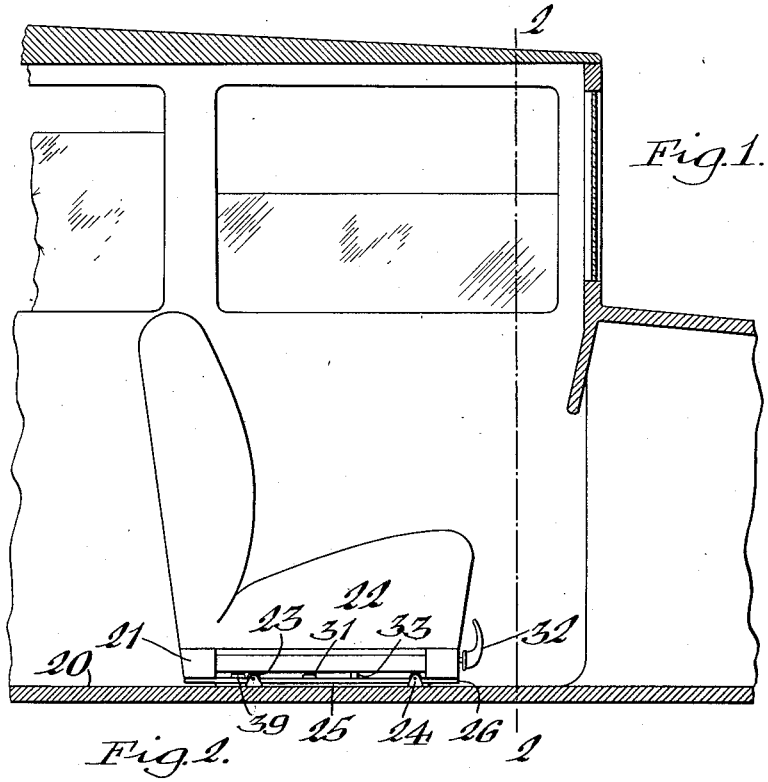
Figure 3:
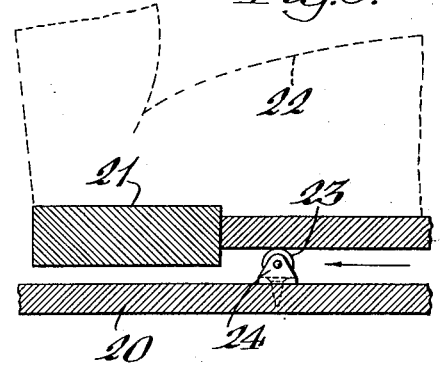
Figure 2:
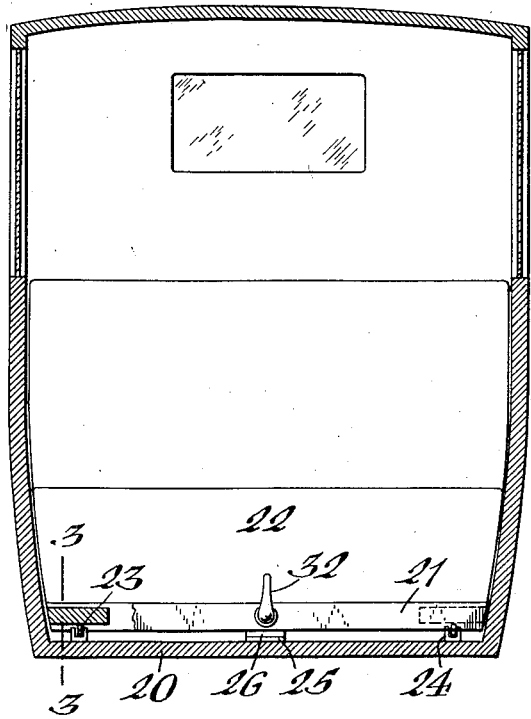

Figure 1 is a fragmentary longitudinal section of an automobile showing my invention applied thereto. Figure 2 is a transverse section thereof taken on line 2—2, Figure 1. Figure 3 is a fragmentary sectional view taken on line 3—3, Figure 2. Figure 4 is a top plan view of the seat-frame and controlling mechanism associated therewith. Figure 5 is an enlarged vertical longitudinal section taken on line 5—5, Figure 4 showing the mechanism in its latched position with the seat partially retracted to correspond to the full line position shown in Figure 4. Figure 6 is a sectional view similar to Figure 5 but showing the mechanism in its unlatched position with the seat projected forwardly to correspond to the dotted line position shown in Figure 4. Figures 7 and 8 are enlarged cross sections taken on the correspondingly numbered lines in Figures 5 and 6, respectively. Figure 9 is a top plan of a seat-frame showing a slightly modified arrangement of the control mechanism. Figure 10 is an enlarged vertical longitudinal section taken on line 10—10, Figure 9, showing the mechanism in its latched position with the seat partially retracted. Figure 11 is a sectional view similar to Figure 10 but showing the mechanism in its unlatched position with the seat in its forwardly projected position. Figures 12 and 13 are enlarged cross sections taken on the correspondingly numbered lines in Figures 10 and 11, respectively. Figure 14 is a vertical longitudinal section of another modified form of the invention. Figure 15 is a perspective view of the base or guide plate of the control mechanism shown in Figure 14. Figure 16 is a similar view of the seat-bearing slide plate thereof. Figure 17 is a perspective view of the latch bar coupling or locking member. Figure 18 is a vertical longitudinal section of another modification of the invention. Figure 19 is a sectional top plan view thereof. Figure 20 is a vertical longitudinal section of a further modification. Figure 21 is a sectional top plan view thereof. Figure 22 is a cross section taken on line 22—22, Figure 20.

Similar characters of reference indicate corresponding parts throughout the several views.

Referring now to Figures 1 to 8 inclusive, 20 indicates the floor of an automobile and 21 the base frame of a cushioned seat 22. At its opposite sides this seat-frame is slidingly supported for movement lengthwise of the vehicle on rollers 23 journaled in brackets 24 fastened to the floor; the underside of the seat frame resting on the top sides of the rollers, as seen in Figures 1, 2 and 3. The floors of present day automobiles are carpeted, and by this guiding arrangement, the contact is between the rollers and the seat-frame, thereby entirely eliminating wear and friction on the carpet.

Disposed lengthwise of the car substantially centrally beneath the seat is the control mechanism therefor which consists generally of a pair of relatively movable superposed members for permitting a longitudinal sliding movement of the seat relative to the floor, automatic means for propelling the seat in one direction, and a manually controlled element for selectively governing the seat's movement to a desired position and for positively locking it and simultaneously clamping the relatively movable members in a rigid position when a given seat-setting has been selected.

The relatively movable members of the seat-control mechanism consist of a base plate 25 suitably fastened to the floor of the car and an overlying plate 26 adapted to slide lengthwise over the base plate and suitably fastened to the underside of the seat-frame 21. The seat-bearing plate is guided in its longitudinal movement over the floor-plate and held against lateral and vertical displacement relative thereto through the medium of fastening bolts 27, 28, which may serve to anchor the base plate to the floor and whose upper shank portions engage a longitudinal slot or slots 29 in the companion plate 26.

For the purpose of adjusting and locking the seat in any one of a plurality of positions, I provide a controlling element which preferably consists of a horizontal lock-bar 30 disposed substantially parallel with the plates 25, 26 and journaled adjacent its front and rear ends in suitable bearing brackets 31, 31 secured to the seat-bearing plate 26, said bar being rotatable in the brackets and extending at its front end through the seat-frame 21 where it is provided with an operating handle 32. The intermediate portion of this lock-bar passes through a companion locking member or block 33, which, in the illustration of the invention shown in Figures 5, 6, 7, 8, 10, 11, 12 and 13, is formed integral with the fastening bolt 28 and has a transverse slot or opening 34 therein for the passage of the lock-bar. In one of its longitudinal edges the latter is provided with a row of locking notches 35 which are adapted to interlock with the slotted block 33, as shown in Figures 5 and 7, to hold the seat in a desired adjusted position. At its opposite longitudinal edge the lock-bar has a curved or cam-like surface 36 which is adapted to be brought into wedging engagement with the opposing upper side of the locking-block slot 34 and thereby frictionally hold the lock bar against turning in a given set position which has been predetermined by the interlocking of one of the notches 35 in said bar with the block 33. To assist in holding the lock bar in a set adjusted position of the seat and accidently prevent turning or displacement thereof out of its locked position, a coil spring 37 may be applied to its rear end, one end of the spring being connected to the bar and the other end being connected to the adjacent bracket 31. By this arrangement, the spring serves to constantly turn the lock-bar in a direction to bring its notches into locking engagement with the locking-block. To bring the lock-bar to its released or unlocked position shown in Figures 6 and 8, for the purpose of effecting a readjustment of the seat, the occupant of the seat turns the operating handle 32 in the proper direction to bring the lock-bar into alinement with the slot 34 in the block 33, thereby permitting the seat together with the lock bar and its slide plate 26 to be moved forward or backward relative to the lock-block and the base plate 25. When the desired position of the seat is obtained to suit the convenience of its occupant, he turns the handle in the opposite direction to bring the corresponding notch 35 in the lock-bar into engagement with the locking-block.

To facilitate the forward gliding movement of the seat to a given position, I preferably employ an energy-storing element which tends constantly to automatically propel the seat forward, the occupant using his feet braced against the floor of the car to move it rearwardly. This element may consist of a spring 38 connected at one end to some portion of the seat, as for example, to a lug 39 applied to the seat-bearing plate 26, while its other end is connected to the floor of the car or to the locking-block 33.

The lock-bar 30 is preferably so mounted that, in addition to holding the seat in a set position, it simultaneously acts to effectually clamp the relatively movable plates 25, 26 tightly and rigidly to each other to prevent their rattling, and still permits freedom of movement of the seat-bearing plate over the base plate during the act of adjusting the seat. This result is preferably accomplished by so mounting the lock-bar and its associated parts that the seat-bearing plate 26 is forced downwardly into clamping relation with the base plate 25 during the turning of said lock-bar to its interlocked position by reason of the cam or wedge-like action performed between the lock-bar and the companion locking-block, and conversely to release such clamping action when the lock-bar is turned to its unlatched position. For this purpose, the bolts 27, 28, which serve to fasten the base plate to the floor of the car and which bolt 28 carries the lock-block 33, are provided above their threaded shanks with enlarged collars 40 bearing at their lower edges on the top side of the base plate to hold it firmly to the floor and engaging the slots 29 in the seat-bearing plate, the head of the bolt 27 and the bottom of the block 33 overlying the top side of said seat-bearing plate. The bolt-collars are of a height somewhat greater than the thickness of the slidable plate 26 so as to provide sufficient looseness or clearance between the plates to freely permit their relative movement during the shifting of the seat forward and backward. The relative positions of the cam-engaging slot 34 of the locking-block and the bearing portions of the lock-bar 30 in their brackets 31 is such that as the lock-bar is turned into latched position, its cam face acts to force the lock-bar downwardly relatively to the anchored locking-block. This action in turn forces the brackets 31 and slide plate 26 in a corresponding direction to effectually and reliably clamp or bind the latter snugly to the base plate 25, as seen in Figures 5 and 7, the released position of the parts being disclosed in Figures 6 and 8.

Briefly stated, the operation of this sliding seat control is as follows:—

The movement of the seat forward or backward to a position to suit its occupant may be accomplished by the occupant while sitting in the seat or while standing beside it. Should it be desired to shift the seat forward to suit the convenience of the driver in manipulating the controls of the automobile or to facilitate the ingress and egress of passengers to and from the rear seat of the car, the lock-bar handle 32 is turned a quarter of a turn to rock the lock-bar from its latched position shown in Figure 5 to the unlatched position shown in Figure 6, wherein the bar is disposed transversely in line with the slot 34 in the locking-block 33 and the clamping pressure normally applied to the slide plates 25, 26 is now removed to allow them to slide freely relatively to each other. The seat will now be automatically propelled forwardly by the energy-storing spring 38. When the seat reaches the position desired, the operating handle is returned to its normally locked position by the assistance of the spring 37, bringing the alining lock-bar notch into latched engagement with the locking block and simultaneously forcing the seat-bearing plate 26 into clamping engagement with the floor-plate 25 to hold the seat firmly and rigidly against displacement in all directions and tightly bind the parts to avoid rattling. In effecting a rearward adjustment of the seat, should it be occupied, the occupant simply uses foot-pressure to shift the seat rearwardly to the position desired.

In the modified form of the invention shown in Figures 9 to 13 inclusive, the base plate 41 and the seat-bearing plate 42 are fastened at their ends to the floor and seat-frame respectively, by screws 43. The lock bar 44 is journaled in blocks 45 formed integral with bolts 46 having detachable flanged collars 47 at their lower ends which engage longitudinal slots 48 in the base-plate and which are free to slide therein during the forward and backward adjustment of the seat. The locking-block 49 through which the lock bar extends, is bolted to the floor and its collar 50 engages a longitudinal slot in the seat-bearing plate 42. In this construction, the floor is provided with longitudinal grooves 51 in line with the plate-slots 48 for receiving the flanges of the collars 47 and the nuts 52 of the bolts 46. The operation of this modified form of the invention is the same as that of the previous construction.

In the modification illustrated in Figures 14 to 17 inclusive, the base plate 53 is in the form of a channel bar which serves to properly guide the seat-bearing plate 54 during the forward and backward movements of the seat. The lock bar 55 is journaled in bearing-blocks 56 which may be integral with or riveted to the seat-bearing plate, and the locking-block 57 through which said lock-bar, extends is bolted directly to the base plate 53, the fastening nut 58 thereof being received in a recess 59 provided in the floor of the car. The shank of the lock-block fastening bolt has a collar 60 at its upper end which engages a longitudinal slot 61 in the seat-bearing plate 54 to permit of the necessary relative movements of the parts. The remaining features of construction and mode of operation are identical with those previously described.

The modification shown in Figures 18 and 19 includes a revolvable lock-bar 62 held against longitudinal movement in a bracket 63 and lockingblock 64 and terminating at its rear end in right and left hand threaded portions 65, 66 engaging corresponding threads on wedges 67 guided for opposing longitudinal movement in openings 68 formed in the locking block and whose top walls are tapered to correspond to the wedges. Upon turning the lock-bar in one direction the wedges are correspondingly shifted to hold the seat-bearing slide plate 42 in its locked position on the base-plate 41, and when turned in the opposite direction the wedges are shifted to a position to release their grip and allow a relative sliding movement of the plates. This construction also produces the clamping together of the plates 41, 42.

In the modification shown in Figures 20, 21 and 22, the lock-bar 69 is in the form of a flat-sided screw or grooved rod supported at its ends in brackets 70 on the slide plate 42 and extending through a similarly-shaped opening 71 in the locking-block 72, the flat-sided portion of said opening being threaded or grooved as shown at 73 to effect an interlocking of the corresponding portion of the bar therewith. When the latter is turned to a released position in register with the locking-block opening 71, adjustment of the seat is readily effected, and when the threaded portion of the lock-bar is turned into engagement with the corresponding portion of said opening, the seat is held in its set position. If desired, the end journals of the lock-bar may be eccentric to its grooved portion to obtain the clamping action on the plates 41, 42 when the bar is set in its operative position.

The rollers 23 or other equivalent anti-friction elements, interposed between the floor and the seat to effect the free gliding action of the latter to a desired position, are preferably so mounted in practise as to support the seat, in the unlatched position of the lock-bar 30, at an elevation to bring the seat-bearing member 26 clear of engagement with the floor member 25, such position being shown in Figure 6. In the latched position of the parts, the resulting cam or wedge-like action between the lock-bar and the companion locking-block 33 forces the seat-bearing member downwardly and practically strains or springs the seat-frame with it to firmly pinch or draw the latter on to the rollers 23, thereby effectually holding the seat against both longitudinal and vertical displacement and avoiding any looseness or rattling of the parts.

I claim as my invention:—

1. A seat mounting for automobiles and the like, comprising relatively movable seat-guiding members disposed in overlying relation lengthwise of the seat and capable of being clamped along their contiguous faces, one of said members being adapted for attachment to the floor of the vehicle and the other to the seat, the seat-bearing member being capable of flexing toward and from the floor member, and latching means for adjusting the seat bearing member in any one of a plurality of positions including a revolvable element mounted on one of said members and an element mounted on the other member and having an opening therein for receiving said revolvable element, the revolvable element interlocking with its complementary latching element in one position and exerting a clamping action to flex the seat-bearing member in contiguous gripping contact with the floor-member and being released therefrom in another position to permit longitudinal adjustment of the seat and its latching element relative to the floor and its complementary latching element.

2. A seat mounting for automobiles and the like, comprising superposed relatively slidable seat-guiding members, one of said members being adapted for attachment to the floor of the vehicle and the other to the seat, one of said members being mounted to flex toward and away from the other member, complementary, fixed and rotatable latching elements applied to said members for releasably holding the seat in any one of a plurality of positions, the rotatable latch element being disposed with its axis parallel to said members, and means governed by the relative rotation of said rotatable latching element for effecting the movement of the flexing member toward and from the other member simultaneously with the movement of the latching elements to their latched and unlatched positions, respectively.

3. A seat mounting for automobiles and the like, comprising slidingly interconnected, superposed relatively movable seat-guiding members, one of said members being adapted for attachment to the floor of the vehicle and the other to the seat, means for latching the seat-bearing member in any one of a plurality of positions, said means consisting of a locking-block fixed to one of said members and having an opening therein whose axis is parallel to the direction of movement of said members, and a controlling latch-bar fulcrumed on the other member and extending through said block-opening for governing the adjustment of the seat, said bar latching with said block in one position thereof to hold the seat in adjusted position and being released from said block in another position to permit a free axial movement of the latch bar in the opening of the locking block and effect a movement of the seat to a desired position.

4. A seat mounting for automobiles and the like, comprising relatively movable seat-guiding members in overlying bearing relation, one of said members being adapted for attachment to the floor of the vehicle and the other to the seat, means for guiding said members in sliding longitudinal engagement, a latch element fixed to one of said members and having an opening therein parallel to the direction of movement of said members, a second complementary latch element fulcrumed on the other member in parallel relation thereto and extending through said opening in the first latch element, said second latch element having a row of notches in one of its longitudinal edges, one or another of which is adapted to interlock with an edge of the opening in the first-named latch element in one position thereof to latch the seat against movement and to be released from such opening in another position thereof to permit a free axial movement of the notched bar relative to the complementary latch element for effecting a movement of the seat to a desired position.

5. A seat mounting for automobiles and the like, comprising a pair of superposed members guided for relative sliding movement in substantially contiguous relation, one of the members being adapted for attachment to the floor of the vehicle and the other to the seat, means for permitting a limited vertical displacement of said members relative to each other, a locking block fixed to one of said members, the other member being displaceable vertically relatively to said locking-block, and a lock-bar mounted on said last-named member and having means thereon for releasable interlocking engagement with the locking-block to control the sliding of the seat, said lock bar having a portion engageable with said locking block in its interlocked position to effect a relative vertical displacement of said members toward each other in contiguous clamped engagement.

6. A seat mounting for automobiles and the like, comprising a pair of superposed members guided for relative sliding movement, the lower member being adapted for attachment to the floor of the vehicle and the upper member having a longitudinal slot therein and adapted for attachment to the seat, a locking-block having an opening therein fixed to the lower member and including a shank engaging the slot in said upper member, and a lock-bar revolvably mounted on the latter and extending through the locking-block opening for releasable interlocking engagement therewith, said lock-bar being shaped to stress it downwardly when in locked position with the locking-block to clamp the upper seat-bearing member to the lower member.

7. A seat mounting for automobiles and the like, comprising a pair of superposed members guided for relative sliding movement, the lower member being adapted for attachment to the floor of the vehicle and the upper member having a longitudinal slot therein and adapted for attachment to the seat, a locking-block having an opening therein fixed to the lower member and including a shank engaging the slot in said upper member, and a lock-bar revolvably mounted on the upper slide member and having a plurality of locking notches in one of its longitudinal edges for engagement with the locking-block to releasably hold the seat in a predetermined position.

8. A seat mounting for automobiles and the like, comprising a pair of superposed members guided for relative sliding movement, the lower member being adapted for attachment to the floor of the vehicle and the upper member having a longitudinal slot therein and adapted for attachment to the seat, a locking-block having an opening therein fixed to the lower member and including a shank engaging the slot in said upper member, and a lock-bar revolvably mounted on the upper slide member and having a plurality of locking notches in one of its longitudinal edges for engagement with the locking-block to releasably hold the seat in a predetermined position, the other longitudinal edges of the lock-bar being substantially cam-shaped in cross section to exert a downward stress thereon relative to the locking-block to frictionally bind said parts and the slide members to each other, respectively.

9. A seat mounting for automobiles and the like, comprising a pair of members guided for relative sliding movement in overlying relation and capable of being clamped along their contiguous faces, one of the members being attached to the floor of the vehicle and the other to the seat, the seat-bearing member being capable of flexing toward and from the floor member, anti-friction elements mounted on the floor and on which the underside of the seat is adapted to bear for supporting the same, means for permitting a limited vertical displacement of said members relative to each other, and unitary means for latching the seat-bearing member in a set position and for flexing the seat-bearing member toward the floor member for clamping said members frictionally to each other along their contiguous faces, the anti-friction elements in sustaining the seat acting to hold its guide member clear of the floor-member in the unlatched position of said latching and clamping means.

10. A seat mounting for automobiles and the like, comprising a single guide unit consisting of superposed horizontal seat - guiding plates mounted for relative sliding movement in contiguous bearing relation and including companion elements for guiding them longitudinally, one of the plates being adapted for attachment to the floor of the vehicle and the other to the seat whereby the latter is movable in a linear path, and latching means including companion members applied to the guide plates, respectively, for releasably holding the seat-bearing plate in a set position relative to the floor-plate, the actuating member of said latching means being disposed lengthwise of the guide unit for rotary movement and terminating at its front end in a handle and the companion member having an opening through which said actuating member passes, the latter having notches therein for interlocking engagement with an edge of said opening.

11. A seat mounting for automobiles and the like, comprising overlying relatively slidable seat-guiding members, one of said members being adapted for attachment to the floor of the vehicle and the other to the seat, means for guiding said members in sliding longitudinal engagement, means for latching the seat-bearing member against longitudinal displacement in any one of a plurality of positions, means operatively associated with said latching means for positively clamping said members in contiguous relation against vertical displacement in the latched position of the latching means and for releasing such members in free sliding engagement in the unlatched position thereof, and anti-friction elements for supporting the seat and for maintaining said slidable members free and clear of each other during the unlatched position of said means, the seat-bearing member being free to flex into and out of clamping relation with the floor-bearing member in response to the movements of said latching means.

12. A seat mounting for automobiles and the like, comprising superposed members guided for relative longitudinal sliding movement, one of said members being adapted for attachment to the floor of the vehicle and the other to the seat, means for permitting a limited vertical displacement of said members for affording a free sliding movement thereof, and complementary wedging means applied to said members for releasably clamping them in contiguous relation, one of said wedging means consisting of a shiftable bar mounted on one of said members and the other consisting of a block mounted on the other member and disposed between the ends of said bar and having an opening therein for the passage of the bar, whereby the latter is free to move through said opening during the sliding of the seat, said bar having a cam face thereon for engaging an edge of said block-opening to effect a relative vertical displacement of said members into clamped position.

13. A seat mounting for automobiles and the like, comprising superposed members guided for relative longitudinal sliding movement, one of said members being adapted for attachment to the floor of the vehicle and the other to the seat, a bearing block applied to said floor-member and having an opening therein, and a longitudinally-disposed bar revolvably mounted on the seat-bearing member and extending through said block-opening, said bar having a cam face at one of its longitudinal edges for engaging an edge of the block-opening in one position of the bar to effect a relative vertical displacement of said members into clamping engagement, said bar freely passing through said opening in another position thereof to permit a sliding movement of the seat.

14. A seat mounting for automobiles and the like, comprising slidingly interconnected, superposed relatively movable seat-guiding members, one of said members being adapted for attachment to the floor of the vehicle and the other to the seat, means for latching the seat-bearing member in any one of a plurality of positions, said means consisting of a locking-block fixed to one of said members and having an opening therein whose axis is parallel to the direction of movement of said members, a controlling latch-bar fulcrumed on the other member and extending through said block-opening for governing the adjustment of the seat, said bar latching with said block in one position thereof to hold the seat in adjusted position and being released from said block in another position to permit a free axial movement of the latch bar in the opening of the locking block and effect a movement of the seat to a desired position, and an energy-storing device connected to said members for automatically propelling the seat in one direction when the latch bar is released from the locking block.

15. A seat mounting for automobiles and the like, comprising superposed seat-guiding members guided for relative longitudinal sliding movement, one of said members being adapted for attachment to the floor of the vehicle and the other to the seat, a bearing block applied to said floor-member and having an opening therein, and a longitudinally-disposed bar revolvably mounted on the seat-bearing member and extending through said block-opening, said bar having a row of notches in one of its longitudinal edges, one or another of which is adapted to interlock with an edge of the block-opening in one position of the bar to effect a latching of the seat against sliding movement, said bar freely passing through said opening in another position thereof to permit a sliding movement of the seat.

MONTAGUE P. BROWNE.